United States Patent

Haverty

[11] Patent Number: 5,989,473
[45] Date of Patent: Nov. 23, 1999

[54] MANUFACTURING COMPOSITE PARTS WITH INTEGRAL POROUS COMPONENTS

[75] Inventor: David G. Haverty, 5308 Roberts Dr., Dunwoody, Ga. 30338

[73] Assignee: David G. Haverty, Dunwoody, Ga.

[21] Appl. No.: 08/902,532

[22] Filed: Jul. 29, 1997

Related U.S. Application Data

[60] Provisional application No. 60/022,756, Jul. 29, 1996.
[51] Int. Cl.[6] ............................. B29C 45/00; B05D 3/04
[52] U.S. Cl. ......................... 264/279; 264/87; 264/513; 264/516; 264/572; 264/328.1; 264/DIG. 14; 264/48; 264/279.1; 264/135; 264/129; 427/430.1; 427/299; 427/133
[58] Field of Search ............................... 427/430.1, 307, 427/299, 133, 243, 324, 325; 264/87, 513, 516, 572, 321, 299, 328.1, DIG. 10, DIG. 14, 48, 50, 265, 271.1, 279, 279.1, 135, 129

[56] References Cited

U.S. PATENT DOCUMENTS

| | | | |
|---|---|---|---|
| 2,668,779 | 2/1954 | Herman | 427/325 |
| 3,599,601 | 8/1971 | Ishikawa et al. | 118/50 |
| 4,033,710 | 7/1977 | Hanning | 425/543 |
| 4,101,617 | 7/1978 | Friederich | 264/572 |
| 4,248,931 | 2/1981 | Salman | 428/317.9 |
| 4,470,859 | 9/1984 | Benezra et al. | 156/155 |
| 4,992,307 | 2/1991 | Ikeda | 427/297 |
| 5,098,267 | 3/1992 | Cheng | 425/4 R |
| 5,098,498 | 3/1992 | Hale et al. | 156/213 |
| 5,564,447 | 10/1996 | Niedermair | 134/5 |

*Primary Examiner*—Michael Lusignan
*Assistant Examiner*—Michael Barr

[57] ABSTRACT

A molding process in which a material with an open cell, porous structure 10 is placed, aligned or supported inside a suitable enclosed holding device. Another molding material 20 is subsequently injected into the said holding device while gas and/or pressure is sequentially applied to the said holding device, causing a synergistic interaction and joining between the said materials to take place. During the processing phase, gas is evenly dispersed throughout the porous core, effectively equalizing cavity pressure and permitting an even flow pattern to exist, encapsulating or sandwiching the said porous structure, thus forming a composite material with physical properties which are substantially greater than the individual components.

10 Claims, 11 Drawing Sheets

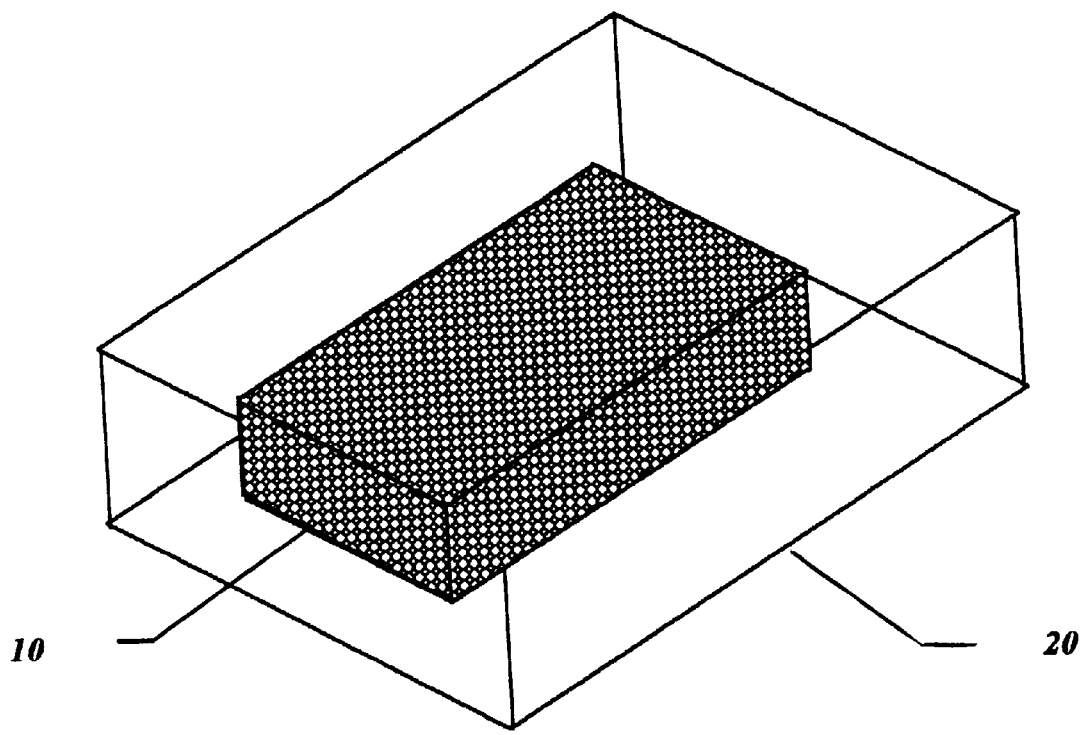
Figure 1
Legend for Figures 1, 2, and 3:
Solid Material 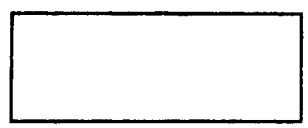
Porous Material 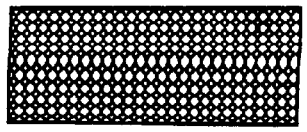

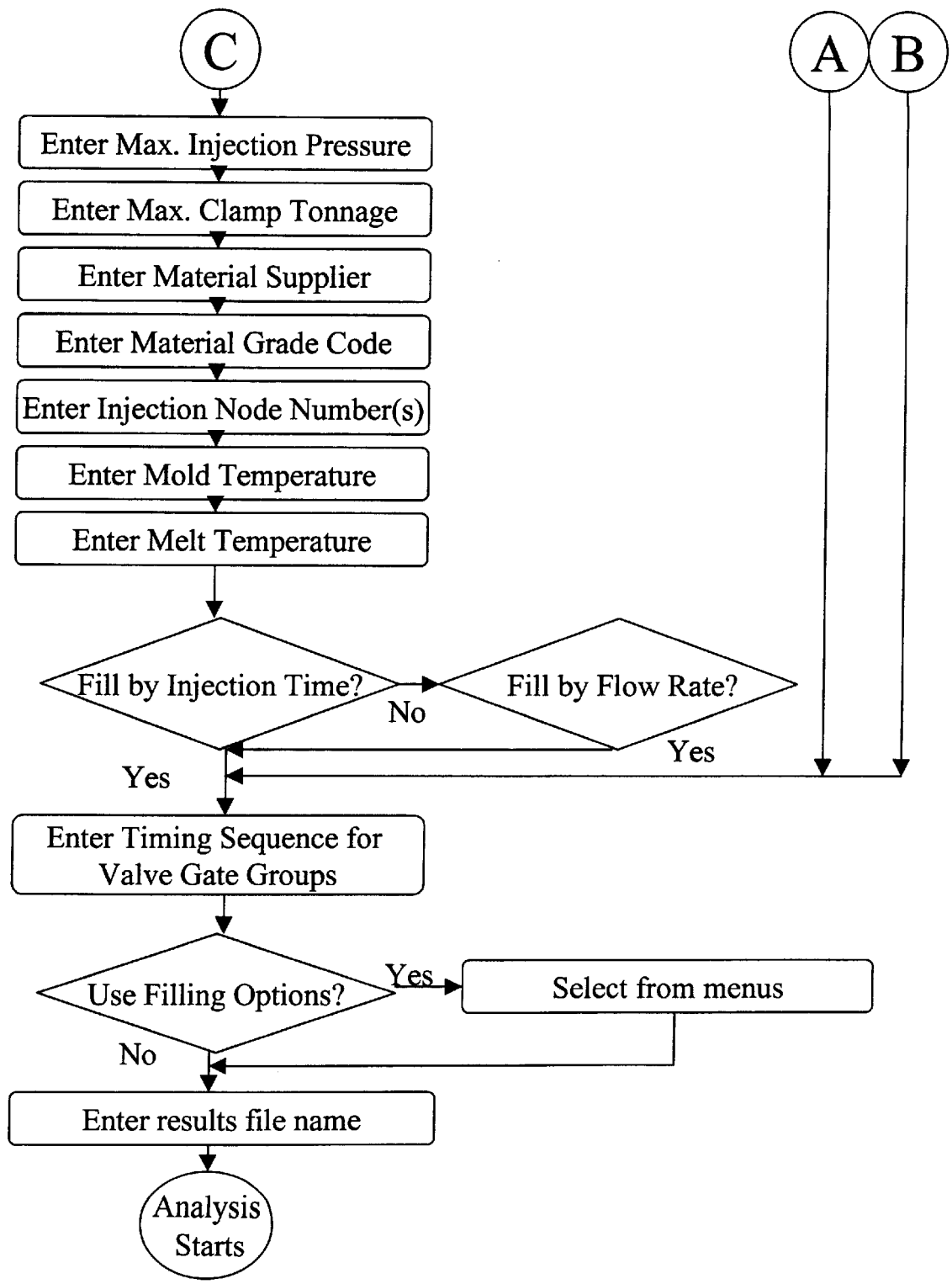
Figure 7B: (continued from previous page)

MANUFACTURING COMPOSITE PARTS WITH INTEGRAL POROUS COMPONENTS

This application claims benefit of Provisional Application Ser. No. 60/022756 filed Jul. 29, 1996.

BACKGROUND

1. Field of the Invention

This invention relates to molding a material of one density, around or sandwiched with lower density materials, to yield a single composite with significantly improved physical properties than those of the individual components.

2. Discussion of Prior Art

The conventional injection molding process is a high pressure process which has never been conducive to molding thick wall sections with or without integral delicate features or light weight cores. This is mostly due to the fact that conventional injection molding is a high pressure process employing injection pressures up to several thousand pounds per square inch (psi).

While the more recent invention of gas-assisted injection molding has proven useful for achieving lower cavity pressure during the filling phase, the process only benefits thin-walled parts which have thicker gas runners built in to the geometry. Gas runners are used with the gas-assist process specifically to allow a path for the gas to flow into. Gas injected into a part being molded will core out the thicker internal regions which are molten, while the surfaces touching the walls of the mold freeze off, forming parts with hollow channels in the gas runners. The resulting parts exhibit excellent physical properties, not to mention lower cost due to less material and (consequently) smaller molding machinery.

The largest problem facing the gas-assisted injection process to date is that it is virtually impossible to predict how the gas bubble will form inside the gas runner of a gas injection molded part. Equally important is the fact that parts with thick wall sections cannot benefit from gas-assist because the gas bubble formation would occur in a totally random formation, likely causing a "blow through", in which the gas pops through the side of the part. This "blow through" phenomena is analogous to a balloon bursting after being over inflated (you know it is going to break when it is over inflated, but you don't know exactly where the hole will be). Similarly, blow through may also occur even in properly designed gas-assist parts if the process conditions are not optimal. Equally as disturbing as gas blow through is the occurrence of gas fingering. Gas fingering occurs randomly during the gas-assist process. Instead of gas actually blowing out through the sidewall, it displaces material within the wall thickness of the part. This fingering effect can be very damaging to a part because it could occur even in parts that have been designed with gas runners, and you may not be able to actually see it if it occurs internally.

Studies in gas-assisted injection molding (GIM) thus far have not developed techniques for molding parts with multi-dimensional flow paths of varying lengths, geometries with thick walls combined with large surface areas, parts with separate inner cores, and parts that consist of materials other than (or in addition to) plastic. Although not a gas-assist process, the "lost core" technology has been the only technology thus far to offer parts of various shapes with good dimensional characteristics.

The process still does not provide a method for significantly increasing thermal, mechanical and acoustical properties of molded parts, nor does it provide a single molding process capable of producing complex geometric shapes with low weight and high strength. Moreover, the lost core process requires labor intensive secondary operations necessary to remove the inner core after parts have been molded.

The original motivation behind my process was to develop a synthetic polymer bone compound to be used in vehicle crash test simulations. The bone was to have similar properties and features as the human skull. Ideally, the bone was to consist of thick hollow sections with an integral skin and foam core. The project turned out to be very complicated and ultimately it was decided that a simplified geometry could be substituted for the skull which had the necessary qualities needed for crash test simulations. Later it was determined that the synthetic bone project had many features that would be difficult, if not impossible to accomplish by means of the conventional injection molding process.

The simplified geometry that I used contains a flat open cell (porous) foam core plate that is held in place by delicate pins in the mold. Material flowing into the cavity would have to flow around the inner core while filling very thick sections over a large surface area. The conventional injection molding process is a high pressure process which generates filling pressures up to several thousand pounds per square inch (psi). It was determined that these high cavity pressures would be detrimental to this part, and therefore gas-assisted injection molding became a likely alternative for molding the part.

A project by Matsushita Corporation found that the gas-assisted injection molding (GIM) process could be used to mold parts with delicate pins successfully. Therefore, the GIM process, being a low pressure process, became a feasible alternative for the bone project. It was believed that because this process produces very low filling pressures (frequently around 500 psi), this part, and similar thick-walled parts with large surface areas could be produced with good results. The only drawback was that this part contained geometric features that the current GIM studies and processes had not yet investigated.

OBJECTS AND ADVANTAGES

Accordingly, there are several important advantages which make my process for molding composites with integral porous cores stand out over all the other techniques. Several objects and advantages of my invention are listed below:

a) the physical properties become significantly greater than they ever could be if the same materials were processed in any of the other prior art molding processes b) does not need gas runners c) defines the volume of gas to use d) provides a location for the gas to flow through e) allows gas to be dispersed throughout the part (not just in narrow runners)

f) eliminates gas "blow through"

g) eliminates gas "fingering"

h) allows parts with delicate inserts to be molded into the part i) provides a method to successfully mold parts with wall thickness greater than what is achievable in conventional or gas-assisted injection molding j) permits a consistent wall thickness (layer) to be molded around a defined, porous interior k) creates a sandwich construction which is many times stronger than the individual components l) materials used applies to all moldable materials including metal m) inner porous material stays in the part after molding, eliminating the need for additional secondary operations n) inner core material may consist of any material with the following properties:
  1) must have open cellular structure (molded, grown or machined)
  2) must have a higher melting point than the skin material if being used in a thermal molding process
  3) must be chemically compatible with the skin material o) allows molding parts with thick walls combined with large surface areas.

BRIEF DESCRIPTION OF DRAWINGS

FIG. 1 is an example of a thick part with an integral porous core or insert 10 and outer layer 20 which is representative of the kind of part that can be produced using my process.

FIGS. 7a and 7b is a multi-laminate filling analysis flow diagram showing the actual sequence used for running an analysis using flow analysis software.

REFERENCE NUMERALS IN DRAWINGS

Figure 2:
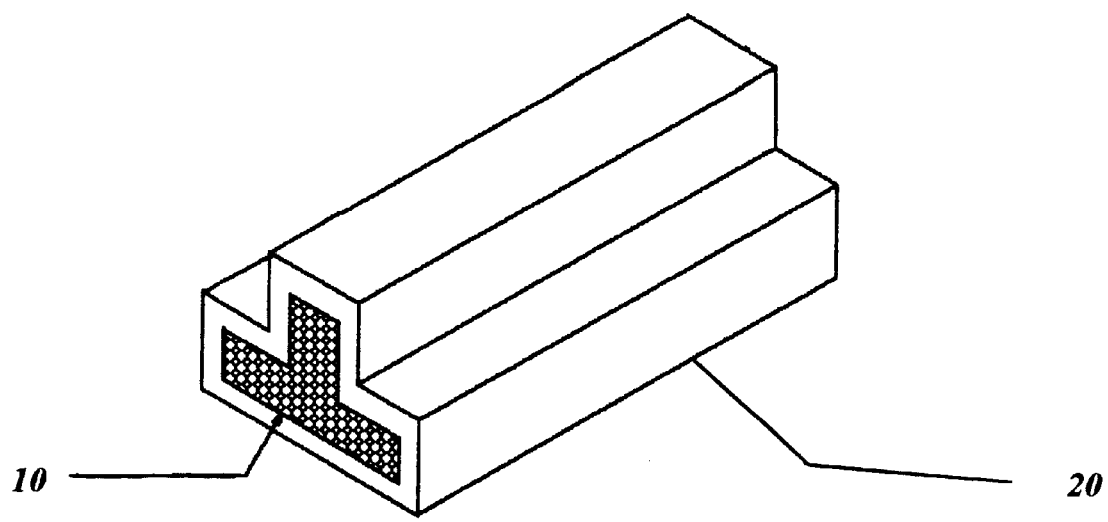
FIG. 2 is an example of a geometry which has the porous component 10 exposed at both ends (only one end is shown).

2 Thin surface
3 Gas runner
10 Porous material
20 Solid material
30 Locator ring
31 Sprue bushing
32 Leader pin
33 Runner
34 Gate
35 Top plate
36 Runner plate
37 Porous insert plate
38 Bottom plate
38A Cavity (for composite) plate
39 O-ring gasket
40 Holding pin

DESCRIPTION OF INVENTION

Figure 3:
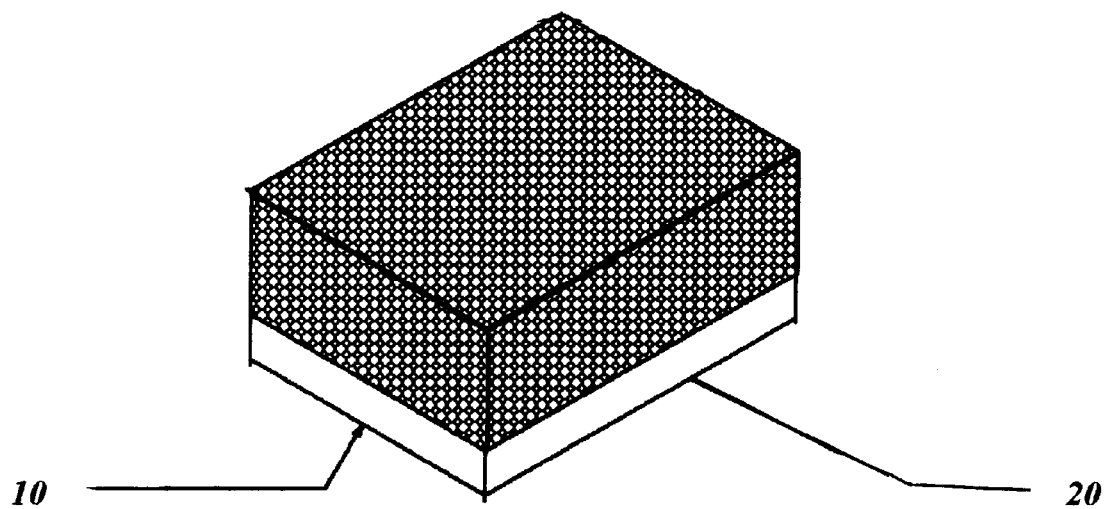
FIG. 3 is another example of a geometry which can benefit from my process. It shows a thick porous layer 10 sandwiched with the solid skin layer 20.
Figure 4:
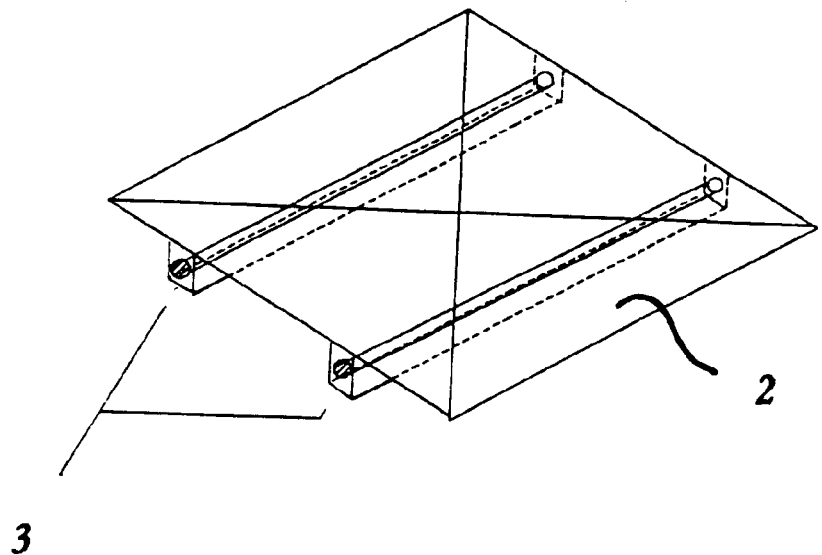
FIG. 4 is a typical prior art GIM part showing thin surface 2 and gas runners 3
Figure 5:
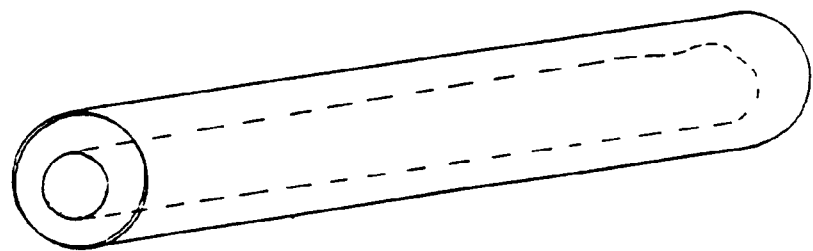
FIG. 5 is another prior art (Lost Core) geometry.

FIGS. 4 and 5 represent typical geometries which can be achieved using the prior art. The configuration of FIG. 4, showing a flat thin surface 2 with thicker gas runners 3 is commonly used with GIM, while FIG. 5 represents a long tubular section that may be produced with the Lost Core process or GIM if the cross section (diameter) is small enough (typically less than 0.5"). FIGS. 1, 2 and 3 are typical embodiments of the kind of geometries which can be produced with my invention. A typical geometry consists of a porous layer, foam core or open cellular structure 10 (FIG. 1) which in this particular case is shown completely encapsulated by an outer layer of material 20 which becomes an integral skin on the part, and can have any thickness within the wall thickness range specified my the resin manufacturer. FIG. 2 shows a long geometry with varying wall thickness 20 and the porous interior 10 exposed on each end. The interior porous section 10 in this case and in FIGS. 1 and 3 are much thicker than the maximum wall thickness which can be achieved using either conventional injection molding, GIM, or Co-Injection, but may be possible with Lost Core technology. FIG. 3 shows how a sandwiched variation looks.

A porous layer 10 may consist of any type of natural or synthetic material as long as it has an open cellular nature capable of holding gas, and a higher melting point than the material it will be mated with. This means that the material can be an open cell foamed polymer or porous material such as selective laser sintering, metal casting or machined part. To make an open cell foam compound for injection molding, use an injection moldable grade of acrylic resin available from Rohm & Haas Corporation. For every pound of resin, mix in 3–5 drops of mineral oil which will serve as a coupling agent. Next, mix in 2% (by weight) of blowing agent. The preferred blowing agent is Hydrocerol BIH from the Henley Chemical Corporation, however any endothermic blowing agent can be used as long as directions are followed for the particular grade of material. To aid in density reduction, and to serve as a nucleating agent, inorganic hollow glass microballoons or microspheres should be added (0.5% by weight), available from the PQ Corporation. Mix all the ingredients well in a sealed box or drum for 15 minutes, then load into an injection molding machine fitted with an automatic shut-off valve.

Before molding the composite parts, a technique for determining the optimal processing conditions must be used so that acceptable parts can be produced. Flow analysis software is available from Moldflow Corporation which can be utilized to model and simulate proper molding of composite parts with integral porous components. Computer simulations began with the creation of a rapid prototype model. A computer aided engineering rapid prototype model was used to get a quick idea of the moldability of the parts. One of the initial part designs had included various shapes and features which, upon completion of the rapid prototype model, were removed to facilitate the flow analyses. Resulting changes to the rapid model were then applied to the final part models.

The new models consist of three similar parts; two are 4.5" squares with a ¼" radius on the corners and an exterior thickness dimension of ¾", and the third is a 4" square with a ¼" radius on the corners, and a ¼" thickness. A difference between the two thicker models is that one has an assigned thickness of ¾", making it a solid, and the other is modeled as a hollow box with an assigned wall thickness of ¼". The hollow interior of this part has the same dimensions as the core insert part. A thinner ¼" thick model was used to determine the injection location and fill time for the core material.

It was decided that because the present technology for modeling flow in plastic injection molded parts is not capable of simulating the interaction of variable density polymer composites, or parts with various additives such as blowing agents and fillers, models representing the flow of individual polymer components could be used in conjunction with each other to establish a similar effect. The idea was to use one model to represent the flow of the skin material, and the other to show the location and amount of gas within the core material. Using this technique, conclusions regarding the interaction of gas, skin material and core material were developed.

Figure 6:
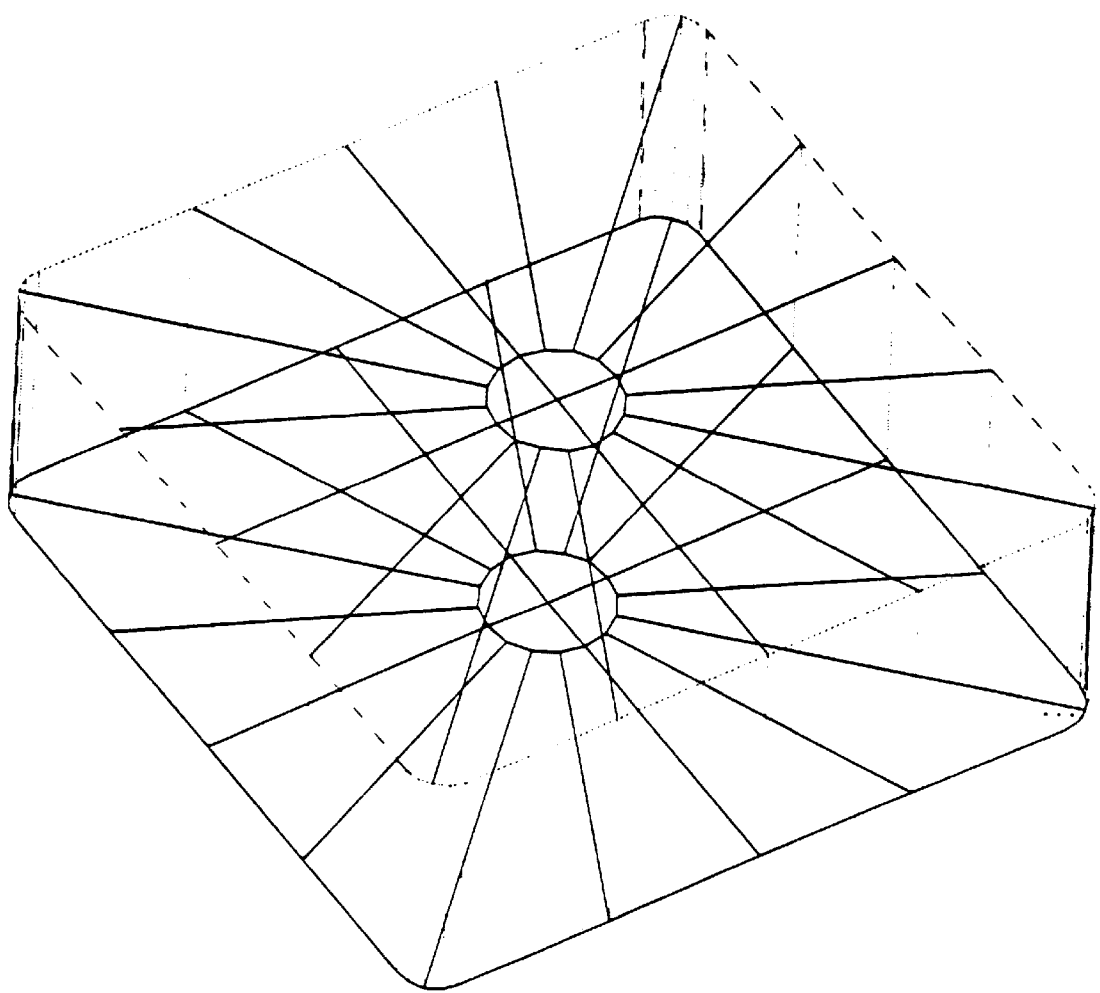
FIG. 6 is a wire frame representation of the hollow part (Case5)

The models used in this example are intended to represent all geometries that would benefit from this invention, and are used in the simulations to show how to arrive at initial part processing conditions and mold filling parameters. The first model studied was a hollow ¾" part named Case5 (FIG. 6). The model was created by developing a wire frame representation of the part. A wire frame model (FIG. 6) was constructed by creating a central disk and then extending lines in a radial fashion to form half the planar surface. Next a half surface was mirrored to form the whole surface. Subsequently the wire frame was assigned a thickness of ¼" and then meshed with the necessary density required by the finite element analysis program. A similar procedure was also used to develop the other models. A 4" model Case2 (FIGS. 8, 9, and 10) was used only to get an appropriate fill time and processing temperatures. A hollow box (Case5) was used to model the interaction of the outer skin material and gas as it flows around a separate core material. The core material being simulated is air, due to the fact that it closely approximates the thermal conductivity value of an open cell, porous material.

Figure 7A:
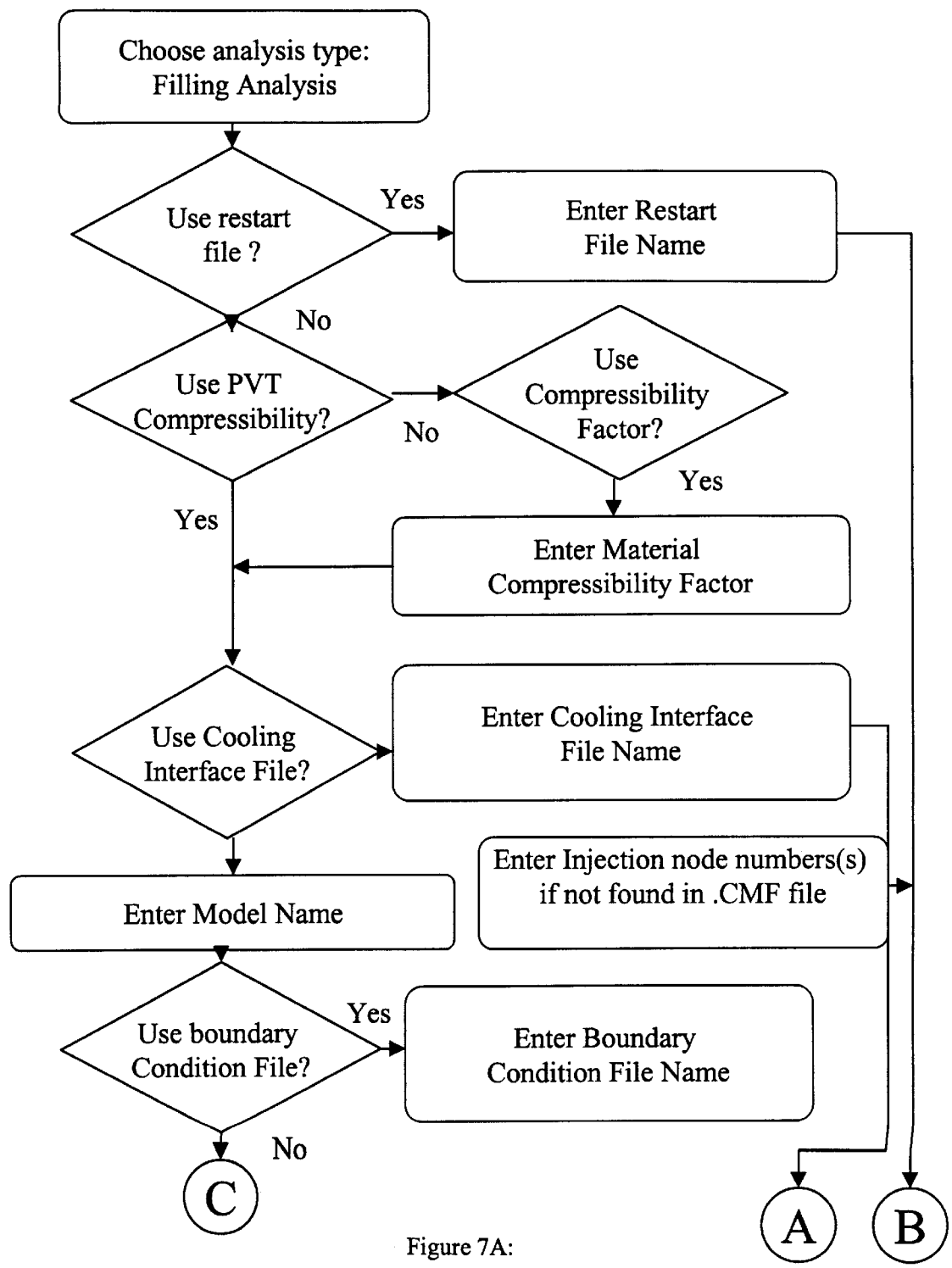

A hollow model should be used for the multi-laminate filling simulation analyses of the solid component, while a single laminate analysis is all that is necessary for the core component analysis. A flow diagram (FIGS. 7a and 7b) shows the actual sequence for running a filling analysis. This sequence was repeated for each model until proper molding conditions were determined. Each time a run was made for a specific geometry, the same material was used, but the molding conditions were changed to compensate for filling problems. Generally, it takes several runs to optimize the filling of a part. Once an analysis is run and data is tabulated, collected or viewed, five features should be observed. They are: temperature, fill time, pressure, cooling time and volumetric shrinkage. By following the directions specified by the flow analysis software manufacturer, one can obtain information regarding fill times and processing conditions.

Figure 8:
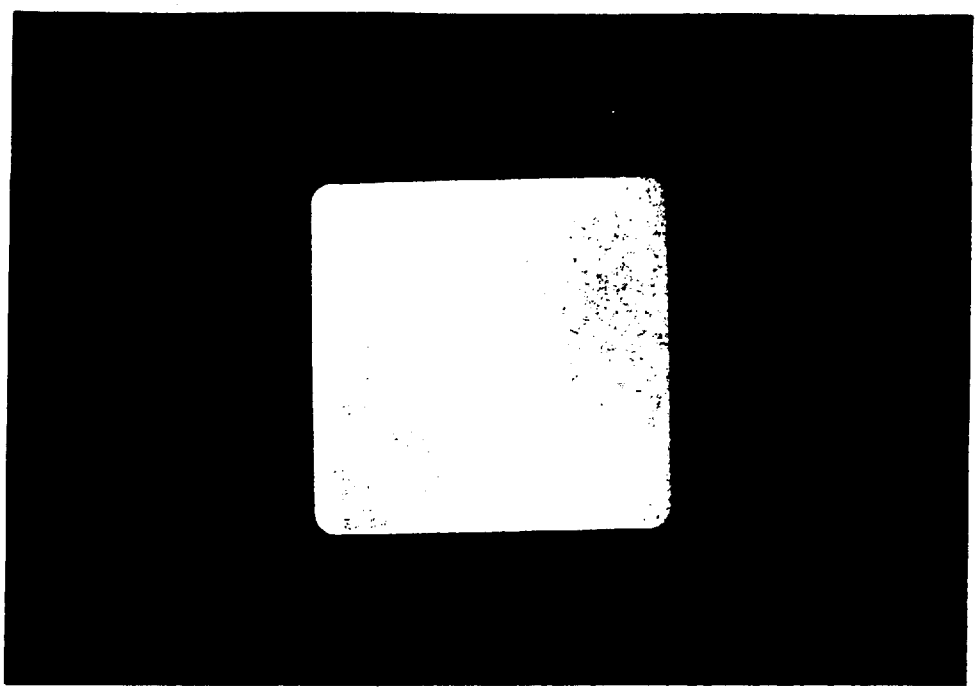
FIG. 8 is a top view of a ¼" thick open cell (porous) foam insert.
Figure 9:
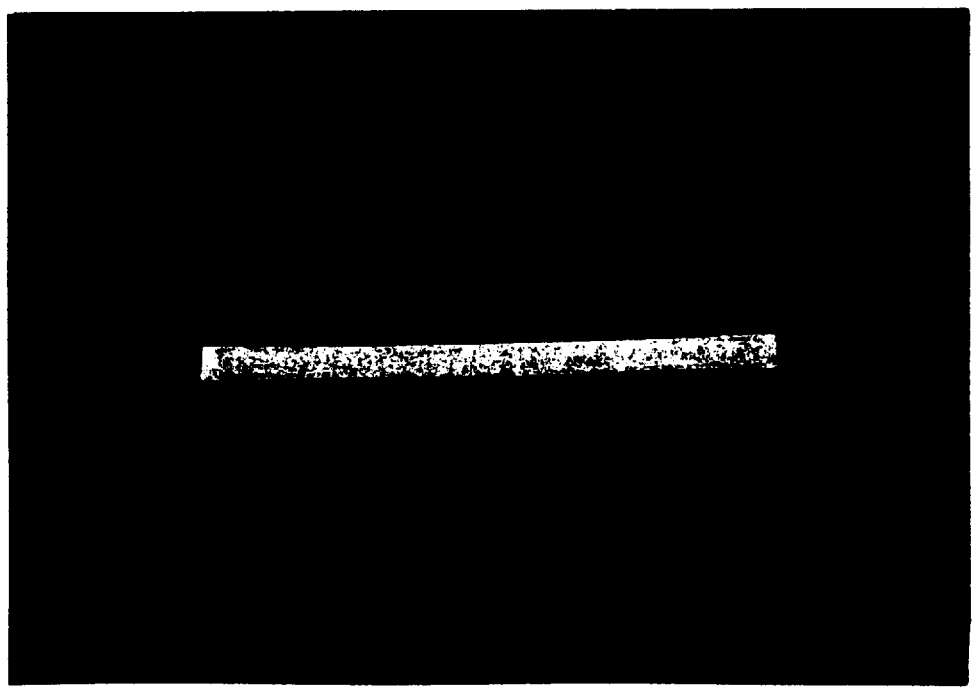
FIG. 9 is a side view of FIG. 8.
Figure 10:
FIG. 10 is a side view of a close-up of FIGS. 8 and 9 (magnified to show open cellular, porous structure).
Figure 11:
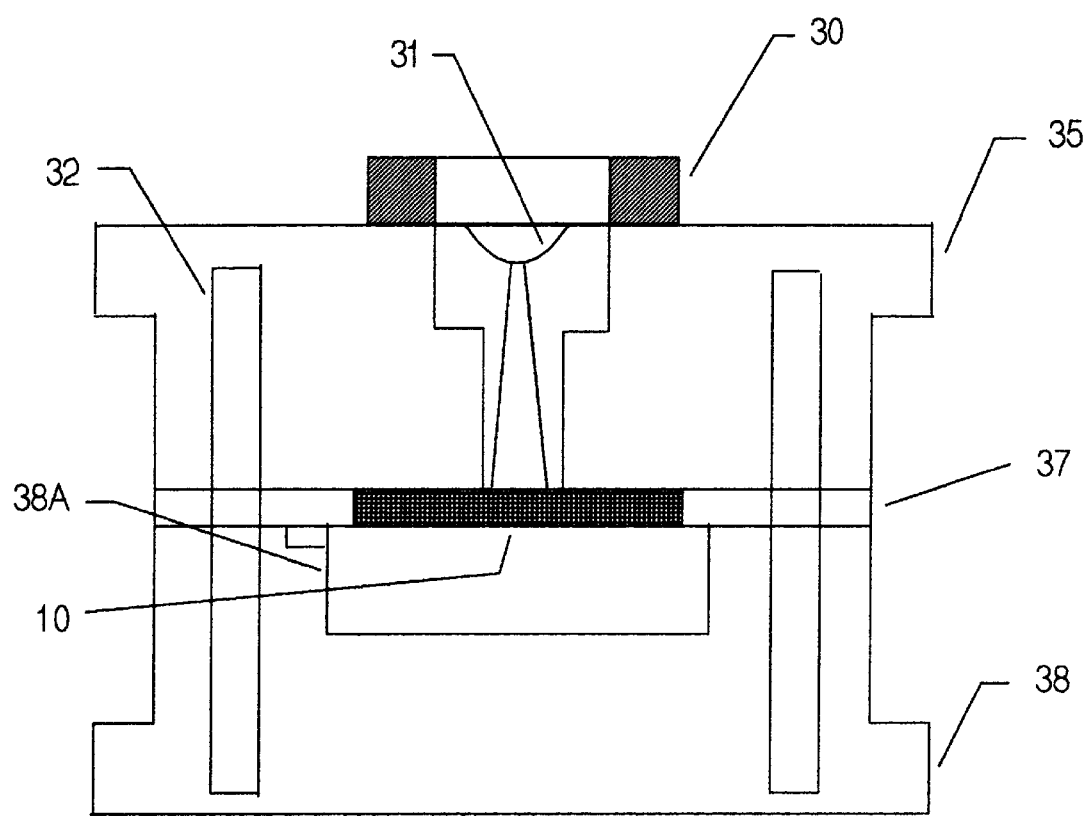
FIG. 11 is a representative injection mold set up for molding porous inserts.
Figure 13:
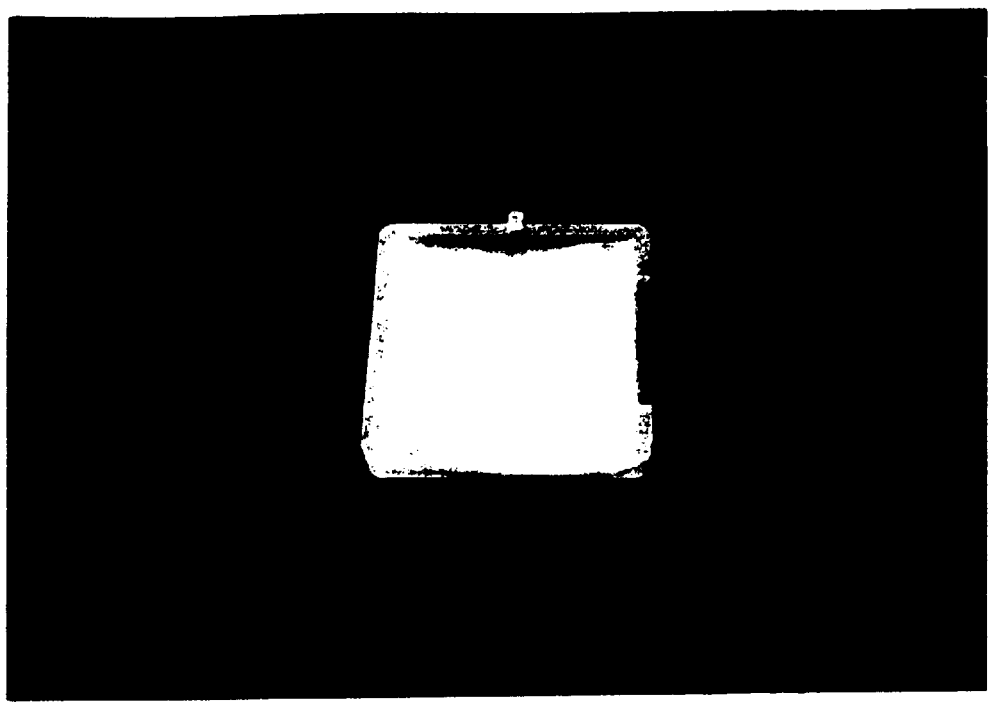
FIG. 13 is a picture of the ¾" thick part with integral porous core and gas components.
Figure 14:
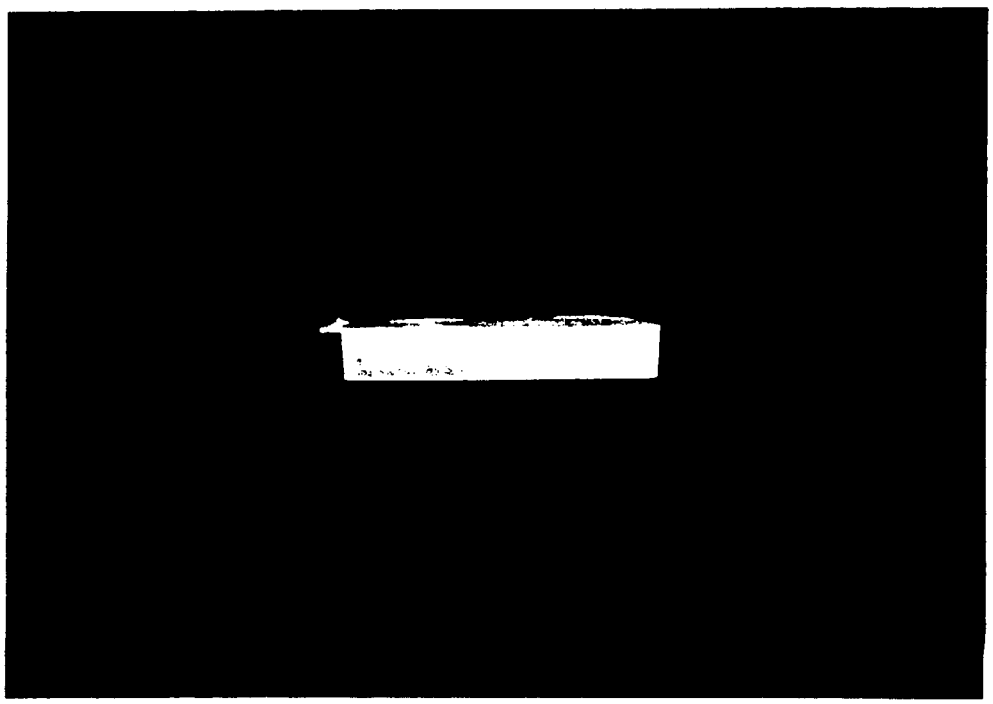
FIG. 14 is a side view of FIG. 13.

Use processing information obtained from the simulations to setup molding machine parameters. Table 1 shows the general properties of the material used to make 10 in FIGS. 8, 9 and 10, and 20 in FIGS. 13 and 14, where 10 (Case2) is acrylic and 20 (Case5) is polystyrene. Porous inserts were molded first using a 3-plate mold (FIG. 11), fitted with a removable insert 38A. The inserts 10 should exhibit an open cell structure as can be seen in FIGS. 8, 9 and 10. With molded inserts in hand, the actual density is calculated for later use in characterization of the complete composite parts.

TABLE 1

|  | Acrylic | Polystyrene |
| --- | --- | --- |
| Ability to foam | excellent | excellent |
| Melting point | 475° F. | 455° F. |
| CLTE | 2.8 in./in/° F. × $10^{-5}$ | 1.8 in./in/° F. × $10^{-5}$ |
| Adhesion | Good | Good |
| Specific Gravity | 1.19 | 1.07 |
| Density | 0.0430 | 0.0386 |

Figure 12:
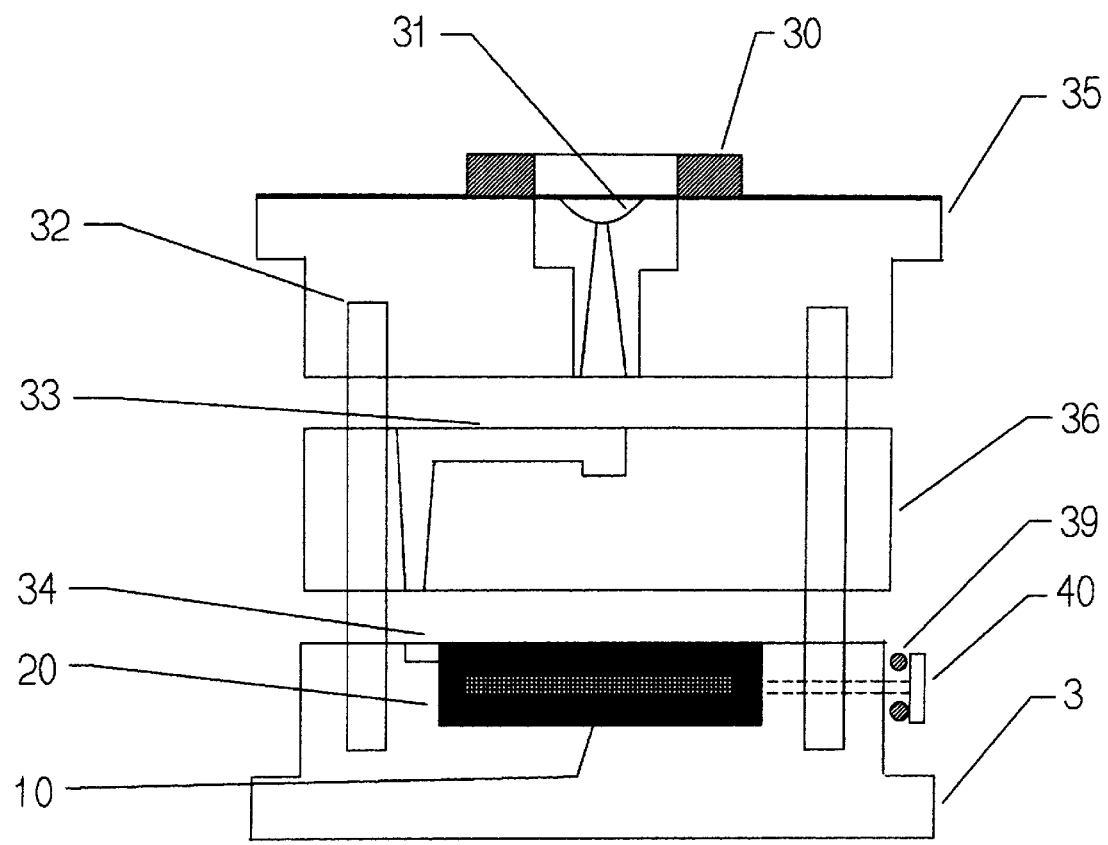
FIG. 12 is a representative injection mold set up for molding thick parts with porous inserts.

Next the same tool was setup to run the polystyrene layer 20 over the inserts 10, with nitrogen gas using nitrogen GIM equipment. The mold (FIG. 12) should have the smaller insert plate 37 and removable insert 38A removed, and subsequently fitted with an additional plate 36 that incorporates a runner 33 which will direct the injected material to the small side of the part through an appropriately sized gate 34, thus reducing the effect of injection pressure on the large surface of the insert. The inserts 10 can be held in place in the cavity created by removing plate 38A with pins 40 extending through the side of plate 38, and should be fitted with o-ring gaskets 39 to hold the gas. The pins are to be fastened to the outside of the plate so that they will not move under the molding pressure.

This combination works well. The gas disperses throughout the open pores and equalizes the cavity pressure, while simultaneously allowing polymer to flow evenly around the entire surface of the open cell inserts. This format produces fully encapsulated parts with integral porous cores (1, 50 and 51) with a minimal amount of machine trial and error. Alternatively, inserts can be placed in the cavity without holding pins to produce a sandwiched composite 3. In either case, the cavity pressure during the filling procedure should be about 500 psi, allowing placement of lightweight inserts within the cavity with no threat of being disturbed by any mechanical action. Conversely, the parts run without the porous inserts (only solid material and gas) did not perform well.

Molding conditions for Case5 filling, Case5 gas filling, and Case2 filling are shown in Tables 2, 3 and 4 below.

TABLE 2

Molding conditions for Case5 filling

| Material | Polystyrene |
| --- | --- |
| Mold temperature | 113° F. |
| Melt temperature | 428° F. |
| Injection time | 6.10 seconds |
| Total volume | 14.65 cu. in. |
| Flow rate | 2.402 cu. in./s |
| Mesh aspect ratio | 2.278 average |

TABLE 3

Molding conditions for Case5 gas filling

| Material | Polystyrene |
| --- | --- |
| Mold temperature | 113° F. |
| Melt temperature | 428° F. |
| Injection time | 6.10 seconds |
| Total volume | 13.42 cu. in. |
| Flow rate | 2.402 cu. in./s |
| Mesh aspect ratio | 2.278 average |

TABLE 4

Molding conditions for Case2 filling

| Material | Acrylic |
|---|---|
| Mold temperature | 113° F. |
| Melt temperature | 453° F. |
| Injection time | 2.2 seconds |
| Total volume | 3.95 cu. in. |
| Flow rate | 1.796 cu. in./s |
| Mesh aspect ratio | 2.003 average |

The complete composite parts (Case5g) have a calculated volume of 15.1473 cubic inches and a weight of 340 grams, has a density of roughly 87 pounds per cubic foot. Notice that the specific gravity chart that was used previously has a size limitation which may make it difficult to accurately measure the density of some parts. This calculation could be solved using proportions of each material if the composite was manufactured using conventional equipment. The GIM versions will have an additional gas component (volume) which shows up in the interior of the parts.

The GIM parts produced in this research contained gas bubbles with a significant volume. To properly determine the density of these parts, part weight, volumetric shrinkage, and gas volume have to be determined. The Moldflow software results file gave an estimate of material volume, but this did not account for the volumetric shrinkage that occurred in the part after it had completely cooled. Typical shrinkage factors are supplied by resin manufacturers, but for this particular part it was about 2.5%. The 2.5% was subtracted from the volume given by the results file. This volume represents the actual plastic, and not the gas. Part weight can simply be determined by weighing the part.

Since D=W/V, it follows that the density of this part is:

$$D=340 \text{ g}/234.07 \text{ cu.cm.}=1.4526 \text{ g/cu.cm. or } 90.68 \text{ lb./cu.ft.}$$

The significance of calculating density value is twofold. First, knowing the density value of an open cell foam will allow a better understanding of the core material will react with gas injection. Second, the density value for the complete compound will give design engineers a better understanding of their products ability to insulate heat or electricity, and absorb or damp sound.

The amount of gas volume in the simulation results file was then compared to the gas process parameters used by the gas filling program to get a better understanding of the interaction of the melt with the gas and foam. First the actual molded part volume was measured. Then the corresponding value in the results file was subtracted from the actual volume. The resulting figure is an estimate of gas volume occurring in the part. As an example, the Case5g simulation, which accurately predicted the location of gas, shows a fill volume of 13.42 cubic inches of material. The gas process works by injecting a short shot of material into the mold and then uses the gas to fill out the cavity. Case5g was a 90% short shot, meaning that the actual volume of plastic that entered the mold was 90% of 13.42 or 12.078 cu. in. The volume of gas then becomes:

| 13.42 | (results file volume of skin material including gas) |
|---|---|
| −12.078 | (short shot results file volume includes plastic only) |
| = 1.342 cu. in. | |

This value represents exactly 10% of the overall part volume. However, due to volumetric shrinkage, this number is actually larger in proportion to the final (post cooling) dimension. The final volume of skin material was:

14.77 cu. in. (measured total volume)

−4.00 cu. in. (core insert volume)

= 10.77 cu. in. of skin material

Note that 1.342 cu. in. of gas was added to this part. This implies that if there were no interaction of the gas with the core material, total volume should be expanded beyond 14.77, to a total of 16.112 cu. in. However this did not occur. It would be reasonable to assume that the difference in volume can be attributed to some of the gas permeating the open cell structure of the foam inserts.

This permeation effect can be seen in the form of small bubbles that occurred where the surfaces of the core and skin materials meet. These bubbles have also been described by Tadmor and Gogos as being the result of dissolved gases occurring in the melt when pressure is lowered. Also noted is bubble formation due to an incubation period. The incubation period was the time needed for polymer injection and gas delay. This added a few seconds to the cycle time which allowed significant bubble formation. The interaction of the bubbles and melt may aid in the adhesion of the two materials.

One objective for my invention was to develop processing parameters for molding plastic parts with thick core sections and large surface areas without gas runners. This objective was met first by showing that a CAE tool can be used, with accuracy, to simulate the volume and regions of polymer and gas within a model by adjusting the processing conditions until the best possible results were achieved. Subsequently, performance of computer results are compared to the actual molding trial results for the ideal representative parts. The results from the computer simulation clearly show that Case5g exhibited the processing conditions that best represent the type of part being studied. The only problem area that showed up in the simulation was part pressure. As mentioned previously, uneven pressure, which is sometimes evidence of over packing the cavity, can lead to warpage. Accordingly, when GIM is applied to parts with thick walls and large surface areas, warp free surfaces with excellent finish and strength to weight ratios can be achieved.

The processing conditions for the two acceptable parts produced (i.e. the Acrylic foam and the Polystyrene over foam composite) are shown in Tables 5 and 6. These tables represent the actual setup sheets used on the molding shop floor. Notice in Table 5 that there were two conditions for timer settings, mold temperature and injection pressure. These conditions were changed during the molding trials because they have the largest influence on part performance. It was determined by trial and error that condition 2 produced the best parts. Condition 2 process settings were not much different than the processing conditions determined by the mold filling simulations. The main difference was the injection pressure, which during actual molding was reduced from 1,500 psi to only 725 psi. This reduction was necessary to facilitate the expansion of the polymer resulting from the blowing agent. It was mentioned that the blowing agent used during the molding trials for the foam inserts was endothermic in nature. This type of blowing agent is very easily influenced by the temperature of the melt, and thus care should be exercised when processing temperatures are being set in order to achieve good foaming and porous cell structure.

TABLE 5

Processing Conditions for the GIM composite part

| BARREL TEMPERATURE ° F. | | |
|---|---|---|
| NOZZLE | 425 | |
| ZONE 1 | 440 | |
| ZONE 2 | 420 | |
| REAR ZONE | 400 | |
| NOZZLE TEMPERATURE ° F. | | |
| TIP | 460 | |
| BODY | 460 | |
| SHUT OFF | 425 | |
| MOLD TEMPERATURE ° F. | | |
| STATIONARY | 70 | |
| MOVABLE | 70 | |
| GAS INJECTION PROFILE (PSI) | | |
| GAS DELAY TIME | | 10 sec. |
| GAS PRESSURE #1 | 500 | 10.0 sec. |
| GAS PRESSURE #2 | 300 | 4.0 sec. |
| GAS PRESSURE #3 | 200 | 10.0 sec. |
| VENT TIME | | 8.0 sec. |
| INJECTION PRESSURE (PSI) | | |
| INJECTION BOOST | 1,500 | |
| INJECTION HOLD | 100 | |
| SCREW BACK PRESSURE | 50 | |
| POSITION SETTINGS | | |
| SHOT SIZE | 2.5" | |
| CUSHION | NONE | |
| TIMER SETTINGS | | |
| INJECTION BOOST | | 7.5 sec. |
| INJECTION HOLD | | 8.0 sec. |
| MOLD CLOSED | | 40.0 sec. |
| MOLD OPEN | — | |
| DECOMPRESSION | .10" | |

AVERAGE OVERALL CYCLE TIME: 65.6 seconds

TABLE 6

Processing Conditions for the open cell foamed Acrylic part

| BARREL TEMPERATURE ° F. | | |
|---|---|---|
| NOZZLE | 454 | |
| ZONE 1 | 501 | |
| ZONE 2 | 483 | |
| REAR ZONE | 453 | |
| NOZZLE TEMPERATURE ° F. | | |
| NOZZLE | 460 | |
| BODY | 460 | |
| SHUT OFF | 460 | |
| MOLD TEMPERATURE ° F. | CONDITION 1 | CONDITION 2 |
| STATIONARY | N/A | N/A |
| MOVABLE | 78 | 132 |
| INJECTION PROFILE (PSI) | CONDITION 1 | CONDITION 2 |
| INJECTION BOOST | 1,450 | 725 |
| INJECTION HOLD | 100 | 50 |
| SCREW BACK PRESSURE | 50 | 50 |
| POSITION SETTINGS | | |
| SHOT SIZE | .75" | |
| CUSHION | NONE | |
| DECOMPRESSION | .10" | |
| EJECTION STROKE | NONE | |
| INJECTION SPEED | MED.–FAST | |
| SCREW SPEED | MEDIUM | |

TABLE 6-continued

Processing Conditions for the open cell foamed Acrylic part

| TIMER SETTINGS | CONDITION 1 | CONDITION 2 |
|---|---|---|
| INJECTION BOOST | .80 sec. | 2.2 sec. |
| INJECTION HOLD | 10.0 sec. | 2.5 sec. |
| MOLD CLOSED | 50.0 sec. | 50.0 sec. |
| MOLD OPEN | N/A | N/A |
| DECOMPRESSION | .10" | .10" |

AVERAGE OVERALL CYCLE TIME: 54.5 seconds

Just as was seen in the molding simulations, the solid ¾" thick part with gas (Case3g) had a random distribution of gas within the interior. The thick region occurred at the end of the flow path. This region had a ¾" thick section of plastic in it as it came out of the mold. This section cooled very slowly in relation to the rest of the part, causing a large amount of shrinkage and warpage to occur in this area. A simulation will predict these differences with accuracy. What will not seem consistent with the actual results is temperature. While the temperature is usually not measured as parts are ejected from the mold, it was easy to tell that the solid regions are much hotter than the cored out sections just by feeling them. The thick regions stay hot for a very long time, while the gas regions will feel only a little warm as parts are removed from the mold.

Molding results for the complete composite parts are the most significant. The computer simulation predicted a melt temperature, fill time, average pressure, and average cooling time that was very close to what actually occurred on the 200 ton Van Dorn injection molding machine (see Table 7). The processing condition that will vary the most from the simulation is gas injection time. Actual gas time may be more than twice as long as the simulation prediction. This extra time is needed to allow the gas to permeate through the foam insert material. If the gas injection pressure is increased too much (typically above 500 psi), the gas will begin to blow up the interior of the foam insert, resulting in what will look like crystal structure on the inside of a geode. This phenomena most likely occurs as a result of the gas being dissolved into the foam, causing a secondary reaction to take place with the blowing agent.

TABLE 7

Comparison of simulation processing conditions with actual processing conditions

| | Simulation | Actual |
|---|---|---|
| Temperature | 473° F. | 460° F. |
| Fill Time | 7.201 seconds | 7.50 seconds |
| Gas Injection Time | 3.987 seconds | 10 seconds |
| Gas Filling Pressure | 672 PSI | 500 PSI |
| Cooling Time | 109 seconds max. | 48 seconds |
| Mold Temperature | 113° F. | 70° F. |

Table 7 shows the similarity of the processing conditions predicted by the computer simulation and the actual molding trial conditions. The extra (actual) gas injection time was needed for gas permeation and distribution within the foam insert.

A final product produced during molding is extremely thick polymer composites with many features and advantages that are new to all the prior art. While the parts created in this example are basically solid blocks with light weight foam interiors, they feature excellent surface finish, good gas bubble distribution, a consistent wall thickness on the exterior, and a consistent wall thickness between the inner core and outer skin. These parts also have less weak sections in the areas of the injection node than similar parts produced with straight GIM. This is a common problem that faces many designers of GIM parts today. Parts produced will have a thicker wall section in the injection node area because the inner core material helped to distribute the gas bubble more effectively.

The most important feature of the new composite parts is that a previously manufactured delicate foam insert can be successfully incorporated as a core material. Mentioned earlier was the fact that this core material must have a higher melting point than the skin material. The results of the delicate core material also mean that other delicate features, including complex insert shapes, insert materials, and core pins may also be added to parts made with this technique.

I have developed several construction guidelines that must be followed in order to mold composites with thick wall sections occurring over large surface areas. These guidelines should be used in conjunction with a gas filling simulation for a hollow part, keeping in mind that an internal, open cell material is used in place of gas runners.

The new guidelines are:

1) The open cell insert must have a melting point that is higher than that of the skin material.
2) The insert must be rigid enough to be held firmly in the cavity with removable or retractable core pins if it is to be overmolded.
3) The base (skin) wall thickness and the wall thickness in the area of the gas runners should be approximately the same.
4) The insert should have a thickness that is at least ⅓ that of the overall part thickness.
5) The insert geometry should be proportionate in size and surface area to the skin material.
6) The wall thickness of the skin material should be the same as the core material thickness.
7) Injection nodes should be located centrally, at the beginning of the flow path.
8) Runners may be used to re-route the injection location.
9) Molds must be gas tight.
10) Gas must permeate the inner core material.

SUMMARY, RAMIFICATIONS AND SCOPE

Accordingly, the reader can see that this research has developed a process for manufacturing composite parts with integral porous components with multi-dimensional flow-paths that demonstrate synergistic qualities that make them physically better than the sum of their individual components. The invention demonstrates that mold flow simulation software can be used to get a good understanding of the melt/gas flow relationship in composites with integral porous cores, before tooling is built. The invention allows increased part size and strength of molded parts over all present molding processes not requiring secondary (post) processing, and makes significant improvements in strength, thermal and sound dampening qualities over the Lost Core process. Another important accomplishment of my invention is the ability to accurately define the volume and location of the gas component through the use of open cell porous inserts, while making it repeatable for production without the worry of blow-through or gas fingering.

The method disclosed is based on a system which allows presently available GIM simulation software to be used in conjunction with my construction guidelines to determine the processing conditions and parameters necessary to begin the manufacturing process. Molding trials revealed that thick parts which had once been considered unlikely candidates for the GIM process (or conventional molding) could now be produced without the use of gas runners. Delicate features in a new mold design were introduced, proving that other delicate features within the cavity may also be incorporated, making the process ideal for future composite part development.

There are many advantages and uses that make this invention multi-dimensional. Rapid prototype models can presently be fabricated from 3-D databases to be used as core inserts. Similarly, recycled products, or environmentally friendly materials could be used together, or with the intent of facilitating biodegradation. Accordingly, the scope of the invention should be determined not by the embodiments illustrated, but rather, by the appended claims and their legal equivalents.

I claim:

1. A method of forming a coated porous article comprising the steps of:
   a) positioning a porous material which is permeable to gas within a holding device, and
   b) applying gas into the said holding device so as to saturate the porous component with gas, wherein,
   c) the application of a liquid material into the said holding device is displaced such that the said porous material is coated, and
   d) allowing sufficient time for the pressure within the said holding device to equalize, and
   e) allowing sufficient time for the liquid coating to be shaped by the said holding device.

2. The method of claim 1 wherein the liquid material fully encapsulates the entire surface of the porous material.

3. The method of claim 1 wherein the liquid material is a polymer.

4. The method of claim 1 wherein the porous component is a rapid prototype part.

5. The method of claim 1 wherein the porous material is held in place.

6. A method for substantially increasing the physical characteristics of an article by molding a uniform layer of material around a porous article forming a composite material with properties greater than those of the said components comprising the steps of:
   a) applying a porous material which is permeable to gas within an enclosed holding device, and
   b) applying gas into the said holding device so as to saturate the porous component with gas, and
   c) applying a curable liquid material into the holding device so as to coat the said porous material, and
   d) allowing the said liquid material to be shaped by the said holding device, while
   e) allowing sufficient time for pressure within the said holding device to equalize and the said liquid material to cure.

7. The method of claim 6 wherein the pressure of the enclosed holding device is reduced.

8. The method off claim 6 wherein the polymer fully encapsulates the entire surface of the porous material.

9. The method of claim 6 wherein the porous material is held into place in the enclosed holding device.

10. The method of claim 7 wherein the porous material is held into place in the enclosed holding device by pins.

* * * * *